Feb. 3, 1942.    J. J. CALHOUN    2,272,034
VEHICLE BODY, ESPECIALLY DOOR
Filed Oct. 10, 1939    3 Sheets-Sheet 1
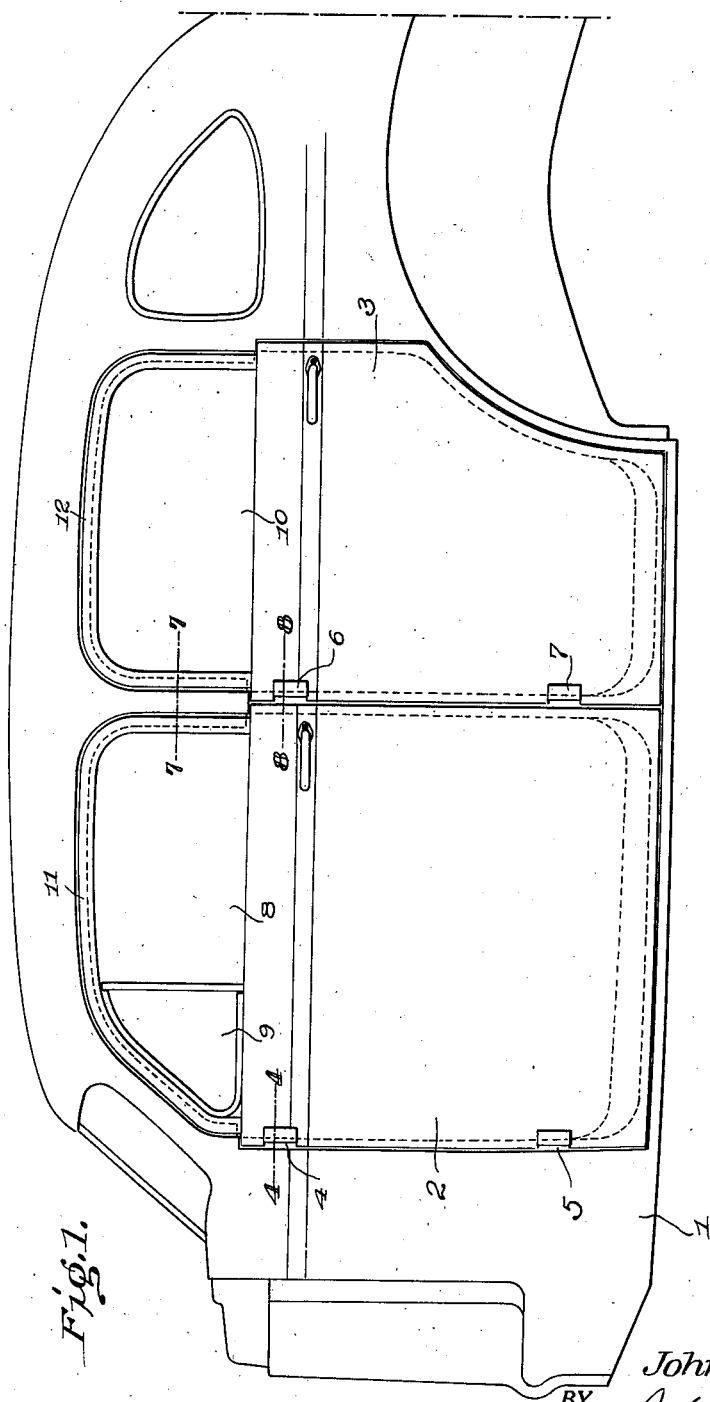
INVENTOR:
John J. Calhoun
BY
ATTORNEY

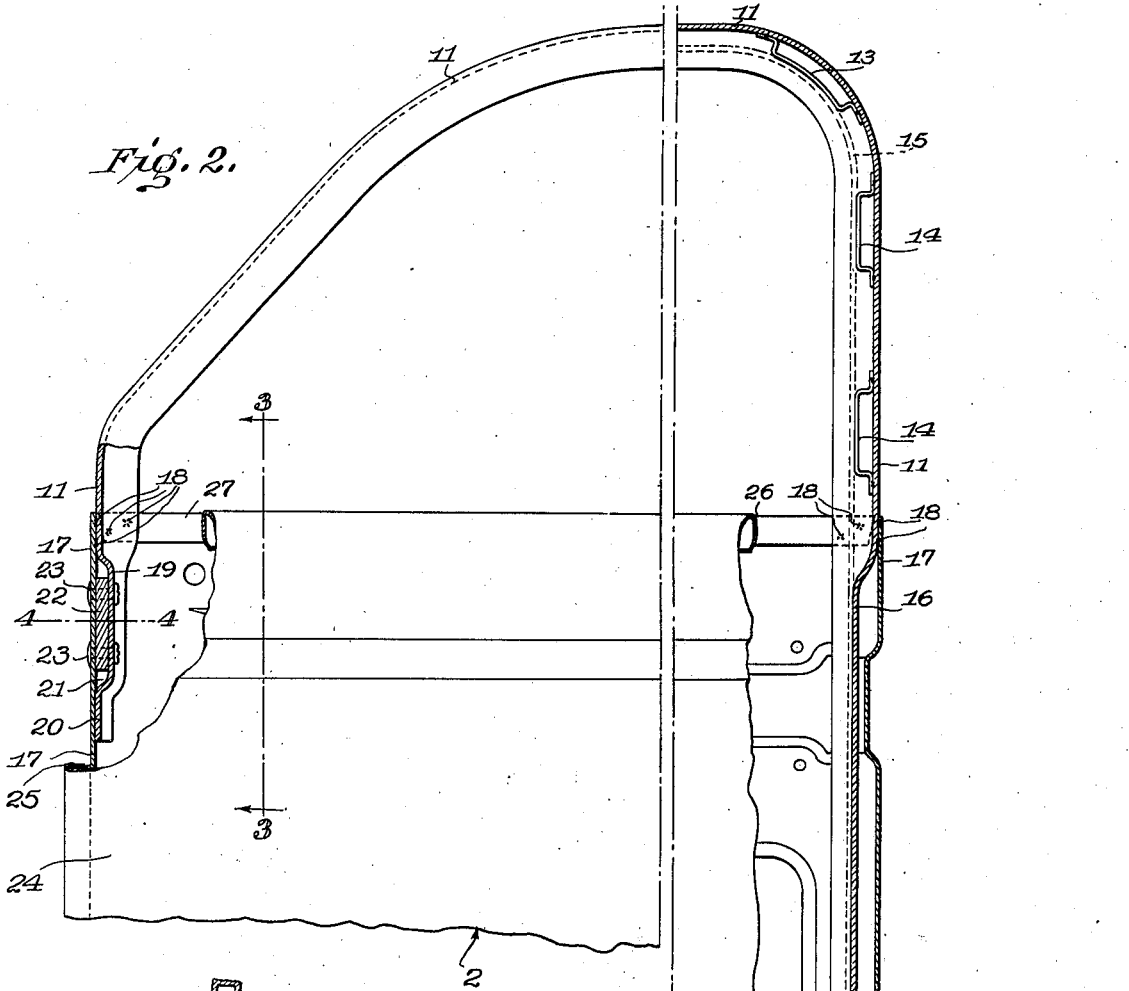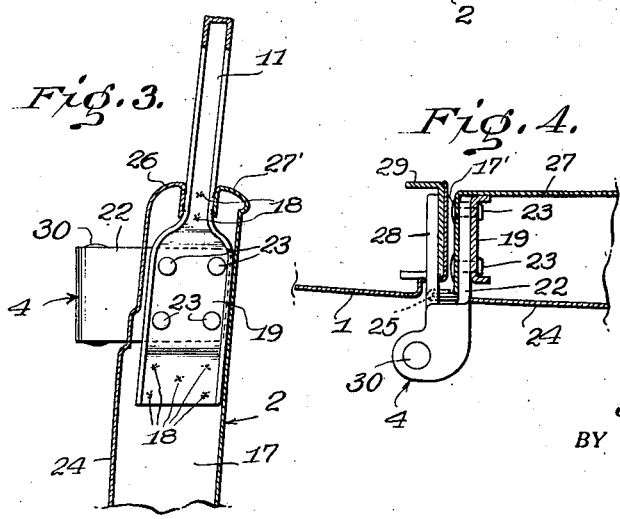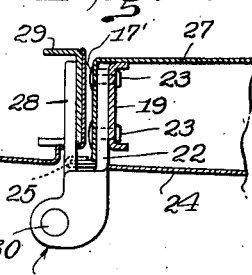

Feb. 3, 1942.    J. J. CALHOUN    2,272,034
VEHICLE BODY, ESPECIALLY DOOR
Filed Oct. 10, 1939    3 Sheets-Sheet 3
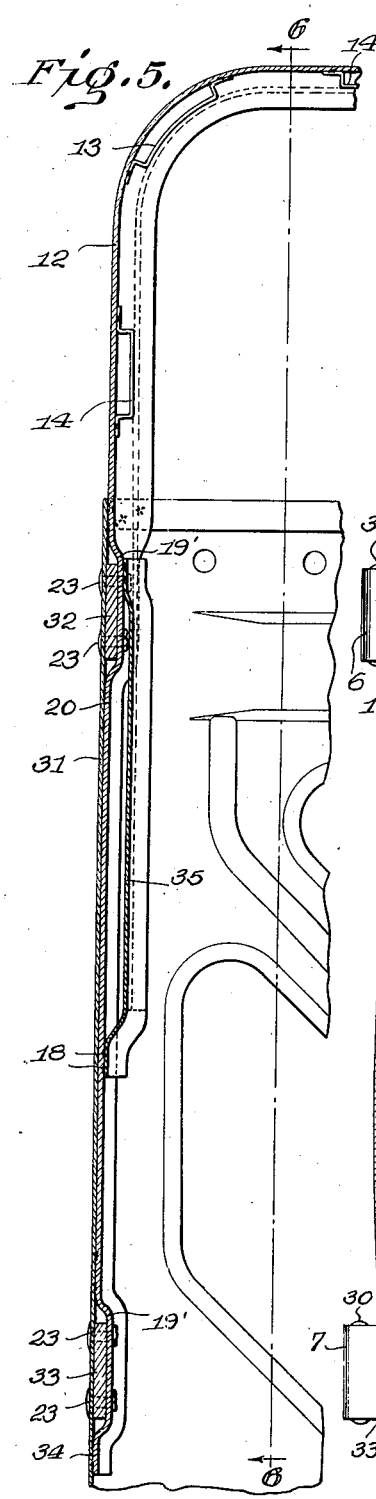
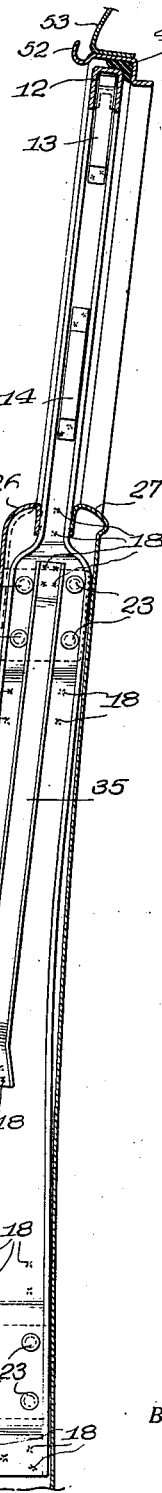
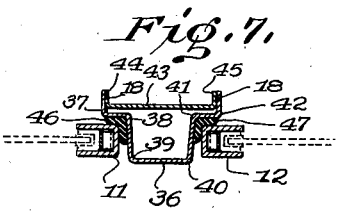
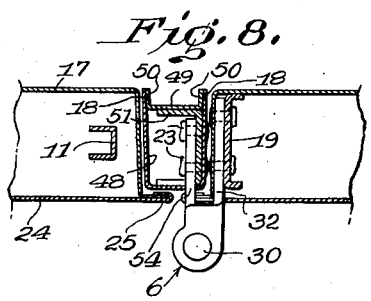
INVENTOR:
John J. Calhoun
BY
ATTORNEY Patented Feb. 3, 1942

2,272,034

UNITED STATES PATENT OFFICE 2,272,034

VEHICLE BODY, ESPECIALLY DOOR

John J. Calhoun, Philadelphia, Pa., assignor to Edward G. Budd Manufacturing Company, Philadelphia, Pa., a corporation of Pennsylvania Application October 10, 1939, Serial No. 298,749

6 Claims. (Cl. 296—44)

The present invention relates to vehicle doors, particularly doors for motor vehicles, which are constructed mainly of metal and glass.

More specifically, it relates to vehicle doors wherein grooved rails of U-shaped section are provided to receive the weather stripping which guides the slidable glass forming part of the door, these rails having special elements therein for spacing the said weather-stripping away from the bottom of the groove.

The invention further relates to providing relatively flattened extensions at the lower ends of the said rails, these extensions being considerably shallower and wider than the rails from which they extend and acting as securing means for the rails as well as forming stiffening and reinforcing members for the lower portion of the door.

The invention relates furthermore to providing a depression or offset in the rail adjacent to the top of the widened part thereof, to provide room for the hinge wing at this point, while a similar offset may also be provided further down for a second hinge or even for a third one, if more than two are present.

A further object is to provide a separate guide channel for the window glass and which is attached to the flattened part of the rail and arranged in alinement with the side walls of the upper vertical portion of the rail and the guide member therein, so as to form a suitable guide or foundation for the glass and the weather stripping.

A still further object is to provide an external flange on the lower portion of the door, which overlaps the door post, said doorpost being in this region comparatively narrow in the longitudinal direction, while transversely deep. At the upper portion the gap between the window rail and the doorpost is covered on the inside by rabbets formed on the doorpost, which in this region on the contrary is comparatively wide longitudinally but relatively shallow in the transverse direction.

Other objects and advantages of the invention will in part be particularly pointed out in the present specification and accompanying drawings, and in part will be obvious from the said disclosure itself.

In said drawings, which illustrate a preferred embodiment of the invention,

Fig. 1 is a side elevation showing a vehicle body, partly cut away at one end, wherein are mounted two doors embodying the invention; this figure is drawn to a smaller scale than the remaining ones;

Fig. 2 is a side elevation, partly in section and partly broken away, showing the structure of the front door;

Fig. 3 is a fragmentary vertical sectional detail of a portion of the door, on the plane indicated by the line 3—3 of Fig. 2;

Fig. 4 is a fragmentary horizontal sectional detail of a portion of the door, and the adjacent portion of the body, the section being made on the plane indicated by the line 4—4 of Fig. 2;

Fig. 5 is a fragmentary elevation, partly in vertical longitudinal section, showing the structure of the guide rail and adjacent parts of the rear door;

Fig. 6 is a vertical section through the door, on the plane indicated by the line 6—6 of Fig. 5;

Fig. 7 is a fragmentary horizontal section through a doorpost and adjacent rails, the section being made on the plane indicated by the line 7—7 of Fig. 1; and Fig. 8 is a similar fragmentary horizontal section through the doorpost and adjacent portions of the doors, the section being made on the plane indicated by the line 8—8 of Fig. 1.

In all the views, similar parts are designated by the same reference characters.

Referring first to Fig. 1, the vehicle body 1 is shown as having two doors 2 and 3 which are mounted by means of hinges 4, 5, 6 and 7. The front door 2 may have a relatively large vertically slidable pane of glass 8 with a smaller pane 9 mounted to pivot about a vertical axis in the customary way to provide controlled ventilation, while the rear door is shown with merely a slidable pane of glass 10. The front door has a rail 11 which is of U-shaped cross section and within which is located the felt or other weather stripping which receives the upper and side edges of the windows when in their closed positions, while the rear door likewise has a similar rail 12.

It will be understood of course that while doors 2 and 3 differ from one another somewhat in shape and size, nevertheless their structural details are the same in many other respects and certain of the same inventive features are adaptable to, and present in, both types of door.

Referring now to Fig. 2, the rail 11 is here shown on a much larger scale, an intermediate portion of the door having been omitted so that the remainder may be shown in greater detail. Reference to Figure 3 taken in conjunction with Fig. 2, clearly shows the U-shaped cross section of the rail 11. It will be noted that inwardly projecting bridge members 13 and 14 are shown, which fill a portion of the channel in the rail and which will cause the weather-stripping 15, indicated in dotted lines in Fig. 2, to be maintained spaced away from the bottom of the rail at a more or less uniform distance. Below the lowermost bridge 14, the bottom surface of the groove of the flattened portion 16 of the rail may be bent into substantial alignment with the tops of the bridges 14, so that such surface of portion 16 will provide a continuation of the guide.

The rail 11 may be secured to the rail 17 formed on the inner door panel in any suitable way, for instance by the spot welds or other suitable fastening means such as rivets, etc., indicated in general by reference character 18. The said portion 16 of the rail, thus in addition to providing a properly positioned guide for the glass, also acts as a reinforcement for the side edge of the door, which materially stiffens it.

At the opposite side edge of the door, the rail 11 may have a bent portion 19, which rejoins the opposite rail 17' of the door at 20, so as to provide both a properly spaced guide for the contiguous edge of the glass, and a hollow or space 21 which will receive one of the wings of a hinge, as indicated at 22. This wing may be secured by means of bolts or rivets 23 or in any other suitable manner.

The outer metal covering 24 may extend beyond the front and rear vertical edges of the door, and may overlap the same, as shown at 25, so as to produce a reinforced edge and at the same time improve the appearance of the door and increase its protective properties. The upper edge of the outer metal covering 24 may be bent downwardly as indicated at 26, to produce a finished reinforced edge, as clearly shown.

The inner metal plate 27 may be similarly bent, as shown at 27'. The bends 26 and 27 are shown in cross section in Fig. 3. This figure and Fig. 4 also show the widened offset portion 19 of the rail 11 as well as the rivets 23 which secure the wing 22 of the hinge 4 to the door 2. The companion wing 28 of the hinge 4 is secured to the channel member 29 extending along the door opening of the body 1, as shown in Fig. 4; 30 represents the hinge pin.

While in Fig. 2 the rail 11 itself has a portion 16 bent into alignment with the tops of the bridge members 14, in Figs. 5 and 6 separate rails are shown to accomplish the same purpose. In these figures the rail 12 may have the bridge members 13 and 14 applied thereto, and below the region of said members it may be bent as at 19', identical with the offset 19 shown in Fig. 2, to provide a pocket for receiving the hinge wing 32 of hinge 6 but below the portion 20, at which the rail again adjoins the metal covering 31 of the door, this rail continues downward in its flattened shallow form to where a further offset 19' substantially identical with the upper bend is provided near the lower end of the door to form a pocket to receive the wing 33 of the lower hinge 7, below which the rail again continues in substantial alignment with the inner face of the metal of the door, to which its end 34 and intermediate sections may be secured. The members 11 hereby strongly reinforce the member 31. In order to provide suitable guide means for the weather stripping in this form of construction, an auxiliary rail section 35 may be suitably fastened to the flange portion of the rail 11, for example by spot welds 18 or the like.

Referring now to Figs. 7 and 8, it will be seen that the door post has two characteristic shapes at its upper and lower portions. The part above the level of the metal portion of the doors 2 and 3 is shown in Fig. 7 and here the door post is wide and shallow, while the part below the metal portion of the doors is shown in Fig. 8, and is narrow but relatively deep. The width of that portion of the post which lies between the two doors is of course approximately uniform, but the characteristic differences of shape are due to the lateral flanges of Fig. 7 or the extra depth of Fig. 8.

In Fig. 7, the post has its outer surface formed of the sheet metal member 36, which is bent successively at 37, 38, 39, 40, 41 and 42 to the configuration illustrated, thus producing a somewhat trapezoidal hollow center portion, having bent flanges at its base, in which is received and secured a closure member 43 with upstanding flanged edges 44 and 45, which are fastened to the other member by spot welds or other suitable means 18. The rails 11, 12 abut against suitable sealing means, such as the rubber strips 46 and 47, to provide weather-tight joints between the doors and the door post.

In Fig. 8, the post is formed of a substantially U-shaped piece of metal 48, a closure member 49 being inserted between the inner ends of the arms of the U, as shown. The closure 49 is a substantially flat piece of metal with upstanding flanges at its edges as shown at 50, and these flanges are secured to the member 48 by any suitable fastenings 18, such as spot welds or the like. In order to reinforce the door post, a U-shaped insert 51 may be built thereinto, said insert fitting against the adjacent walls of the members 48 and 49. Thus a secure support for the door hinges is provided. The hinge 6 is here shown as fastened to the door post by fastenings 23 passing through the wing 54 of the hinge and through the insert 51 and member 48. The members 36 and 48 on the one hand and 43 and 49 on the other hand are preferably together on stamping each.

While the structure and operation of the invention have been clearly explained in detail hereinabove, it may be well to summarize the same briefly as follows:

Referring to Fig. 1, it will be seen that the vehicle body 1 is provided with two doors, 2 and 3, which have opaque or closed lower sections, each surmounted by an open portion terminating in a U-shaped rail which is adapted to receive and guide the glass window of each door, these windows being operable in any desired or known way.

Between the two doors is a vertical door post, the lower portion of which is relatively narrow, as best illustrated in Fig. 8. The front door 2 is hinged to the front edge of the body opening and extends rearward, while the rear door 3 is hinged to the rear edge of the door post and extends rearwardly therefrom. The rear edge of the front door and the front edge of the rear door are placed very close to one another, so that when the doors are closed these edges will practically conceal the narrow lower portion of the door post, as clearly illustrated in Fig. 1. At the same time the door flanges extending beyond the door frames will overlap the adjacent edges of the vehicle body, so as to conceal and protect the remaining openings or cracks, thus adding to the appearance and simultaneously providing a better sealing effect. By reason of the fact that the hinge pins 30 are spaced somewhat beyond the outside of the vehicle body, it is possible for the doors to open without causing the overlapping flanges thereof to interfere with the adjacent edges of the door frames in so doing.

The relatively great depth of the rails 11 and 12 provides a stiff and rugged construction and also adds to the appearance, while the spacing bridges 13 and 14 will decrease the depth of the channels in said rails so that it is possible to provide properly alined guides for the weather stripping which receives and guides the glass panes. It is thus possible to bring the outer edges of the rails into substantial alinement with the vertical side-edges of the doors.

The widened and flattened portions of these rails form excellent reinforcing members for the end walls of the doors, while the additional narrow rails superimposed on said flattened portions within the lower sections of the doors constitute effective continuations of the narrow parts of the rails, so as to provide adequate guides for the glass panels.

It will be noted that the upper part of the door post is narrower in a transverse direction than the portion between the lower sections of the doors, as will be evident from Figs. 7 and 8. In this way a neater construction is provided which merges better into the relatively thinner upper portion or ceiling of the body, while at the same time spreading longitudinally to provide stiffness as well as to accommodate the rabbeted rubber or other strips 46 and 47, against which the guide rails seat when the doors are closed. It will be seen also that the gutter 52 projecting from the top 53 will catch any drip and conduct it away from the doors, said gutter extending downward sufficiently for this purpose, but nevertheless clearing the top of the rail 11, as shown in Fig. 6.

Attention is directed to the form of the members 13 and 14 which are shown in the drawings. These members are made from narrow strips of sheet metal, the ends of which are twice bent off whereby the second bent off section abuts the bottom of the channel 11 or 12 respectively and is fastened thereto as by spot welding. It is obvious, however, that this form of strip which is very cheap and which may be made from scrap metal, could also be substituted by other suitable forms for instance by a continuous strip having depressed and raised portions and of which the depressed portions are fastened to the bottom of the channel 11 or 12.

While the invention has been described by reference to an example which is at present believed to embody the preferred form thereof, it should be clearly understood that this example is disclosed purely for the purpose of illustration and not to limit the scope of the invention, which is defined solely in the following claims.

I claim:

1. A vehicle door having a closed lower section and an open upper section, with a transparent panel mounted therein to close or open said upper section at will, a guide rail extending upward from, and downward into, said lower section, said rail having a relatively deep and narrow U-shaped cross section above the lower section of the door, merging into a relatively shallow and wide flattened U-shaped cross section within the same, said flattened portion being secured to the adjacent end wall of the door to reinforce the latter, and extending substantially to the bottom thereof.

2. A vehicle door having a closed lower section and an open upper section, with a transparent panel mounted therein to close or open said upper section at will, a guide rail extending upward from, and also a substantial distance downward into, said lower section adjacent an end wall thereof, said rail having a relatively deep and narrow U-shaped cross section above the lower section of the door, merging into a relatively shallow and wide flattened U-shaped cross section within the same, said flattened portion being secured to the said adjacent end wall, to reinforce the latter.

3. A vehicle door having a closed lower section and an open upper section, with a transparent panel mounted therein to close or open said upper section at will, a guide rail extending upward from, and also a substantial distance downward into, said lower section adjacent an end wall thereof, said rail having a relatively deep and narrow U-shaped cross section above the lower section of the door, merging into a relatively shallow and wide flattened U-shaped cross section within the same, said flattened portion being secured to the said adjacent end wall, to reinforce the latter, said flattened portion being however offset from said end wall throughout a part of its length, to form an aperture to receive a hinge wing between it and the wall.

4. In a vehicle door having a closed lower section, and an open upper section, with a transparent panel movably mounted therein to close or open said upper section at will, a guide rail of substantially U-shaped cross section secured to said lower section, said rail having a relatively deep and narrow U-shaped cross section above the lower section of the door, merging into a relatively shallow and wide flattened U-shaped cross section within the same, and a guide rail member having substantially the same width and effective depth as the said deep part of the first-named guide rail, said member being secured within the lower section of the door in substantial alinement with said deep part of the first-named guide rail so as to constitute a continuation of the same.

5. In a vehicle door having a closed lower section, and an open upper section, with a transparent panel movably mounted therein to close or open said upper section at will, a guide rail of substantially U-shaped cross section secured to said lower section, said rail having a relatively deep and narrow U-shaped cross section above the lower section of the door, merging into a relatively shallow and wide flattened U-shaped cross section within the same, spacing means located at intervals within the deep portions of the rail to decrease its effective depth and a guide rail substantially the same in width as the said deep part of the first-named guide rail and secured within the lower section of the door with its own bottom in substantial alinement with the tops of the spacing means, to constitute a substantially straight guide for the panel.

6. In a vehicle body of the closed type, a door and a door post, said door comprising a lower closed portion having a relatively great thickness and an upper portion which is provided with a window opening and is of substantially less thickness than the lower portion, the outer side edge of the lower portion of said door which is adjacent to said door posts being provided with a laterally extending flange adapted to overlap the space between the door and the door posts in the closed position of the door, the upper portion of said door being free from said flange, the thickness of the door posts in the region of the lower door portion being about equal to the thickness of this lower door portion, the upper door posts portion which is adjacent the upper door portion being of considerably less thickness than the lower post portion and being provided at about its inner margin with a laterally extending flange, this flange overlapping the space between the upper door portion and the upper posts portion in the closed position of the door from the inside of the body, the lower portion of said door post being free from such flange.

JOHN J. CALHOUN.